United States Patent
Cho et al.

(10) Patent No.: US 8,768,257 B2
(45) Date of Patent: Jul. 1, 2014

(54) METHOD AND APPARATUS FOR RELEASING BLANK ZONE BY MACRO BASE STATION IN WIRELESS COMMUNICATION SYSTEM

(75) Inventors: Han Gyu Cho, Gyeongki-do (KR); Doo Hyun Sung, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 411 days.

(21) Appl. No.: 13/127,852

(22) PCT Filed: Dec. 8, 2009

(86) PCT No.: PCT/KR2009/007303
§ 371 (c)(1),
(2), (4) Date: May 5, 2011

(87) PCT Pub. No.: WO2010/068012
PCT Pub. Date: Jun. 17, 2010

(65) Prior Publication Data
US 2011/0223923 A1  Sep. 15, 2011

Related U.S. Application Data

(60) Provisional application No. 61/121,166, filed on Dec. 9, 2008, provisional application No. 61/138,123, filed on Dec. 17, 2008.

(51) Int. Cl.
| | | |
|---|---|---|
| H04B 1/00 | (2006.01) | |
| H04M 1/66 | (2006.01) | |
| H04M 1/68 | (2006.01) | |
| H04M 3/16 | (2006.01) | |
| H04W 72/00 | (2009.01) | |
| H04B 7/00 | (2006.01) | |
| H04B 15/00 | (2006.01) | |
| H04M 1/00 | (2006.01) | |
| H04B 1/38 | (2006.01) | |

(52) U.S. Cl.
USPC ....... 455/63.1; 455/411; 455/452.1; 455/501; 455/522; 455/561; 370/311; 370/316; 370/321; 370/335; 370/337

(58) Field of Classification Search
CPC ....... H04W 16/14; H04W 28/04; H04B 1/525
USPC ............. 455/448, 444, 63.1, 411, 452.1, 501, 455/522, 561; 370/311, 316, 321, 335, 337, 370/468
See application file for complete search history.

(56) References Cited

U.S. PATENT DOCUMENTS 6,980,530 B2 * 12/2005 Reddy ........................ 370/316
7,069,022 B2   6/2006 Rajaniemi et al.

(Continued)

FOREIGN PATENT DOCUMENTS

| KR | 10-2006-0129887 | 12/2006 |
| KR | 10-2008-0045096 | 5/2008 |
| WO | 2008/106360 | 9/2008 |

OTHER PUBLICATIONS

International Search Report from PCT/KR2009/00007303 (PCT corresponding to present application).

*Primary Examiner* — William D Cumming
(74) *Attorney, Agent, or Firm* — Morgan, Lewis & Bockius LLP

(57) ABSTRACT

Provided are a method and an apparatus for releasing a blank zone by a macro base station in a wireless communication system. The macro base station: receives channel information from a macro terminal that is serviced therefrom; determines based on the channel information whether or not a downlink blank zone allocated to a resource zone of a femto bas station is released; and transmits downlink blank zone release information to the femto base station if the downlink blank zone is supposed to be released. The downlink blank zone is a resource zone which restricts the downlink transmission, among all the resource zones used by the femto base station. The channel information may be the information about the distance between the femto base station and the macro terminal.

13 Claims, 15 Drawing Sheets

(56) References Cited

U.S. PATENT DOCUMENTS

| | | | |
|---|---|---|---|
| 8,260,206 B2* | 9/2012 | Damnjanovic | 455/63.1 |
| 8,442,069 B2* | 5/2013 | Ji et al. | 370/468 |
| 2002/0110094 A1* | 8/2002 | Reddy | 370/316 |
| 2002/0159403 A1* | 10/2002 | Reddy | 370/316 |
| 2003/0091008 A1* | 5/2003 | Miyoshi et al. | 370/335 |
| 2003/0130011 A1* | 7/2003 | Hiramatsu et al. | 455/561 |
| 2005/0130659 A1 | 6/2005 | Grech et al. | |
| 2005/0186948 A1 | 8/2005 | Gallagher et al. | |
| 2005/0207370 A1* | 9/2005 | Harada | 370/321 |
| 2008/0207170 A1* | 8/2008 | Khetawat et al. | 455/411 |
| 2009/0042593 A1* | 2/2009 | Yavuz et al. | 455/522 |
| 2009/0135754 A1* | 5/2009 | Yavuz et al. | 370/311 |
| 2009/0227263 A1* | 9/2009 | Agrawal et al. | 455/452.1 |
| 2009/0257390 A1* | 10/2009 | Ji et al. | 370/329 |
| 2009/0264077 A1* | 10/2009 | Damnjanovic | 455/63.1 |
| 2009/0318182 A1* | 12/2009 | Nagato et al. | 455/522 |
| 2010/0008230 A1* | 1/2010 | Khandekar et al. | 370/237 |
| 2010/0272086 A1* | 10/2010 | Jung et al. | 370/338 |
| 2010/0285795 A1* | 11/2010 | Whinnett | 455/424 |
| 2011/0105133 A1* | 5/2011 | Foster et al. | 455/450 |
| 2011/0195730 A1* | 8/2011 | Chami et al. | 455/501 |
| 2011/0275361 A1* | 11/2011 | Yavuz et al. | 455/422.1 |
| 2011/0300855 A1* | 12/2011 | Zhou et al. | 455/422.1 |

\* cited by examiner

METHOD AND APPARATUS FOR RELEASING BLANK ZONE BY MACRO BASE STATION IN WIRELESS COMMUNICATION SYSTEM

CROSS-REFERENCE TO RELATED APPLICATIONS

This application claims the benefit of priority of U.S. Provisional application No. 61/121,166 filed on Dec. 9, 2008, and U.S. Provisional application No. 61/138,123 filed on Dec. 17, 2008, all of which are incorporated by reference in their entirety herein.

BACKGROUND OF THE INVENTION

1. Field of the Invention

The present invention relates to wireless communications, and more particularly, to a method and apparatus for releasing a blank zone of a femto base station by a macro base station in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

An 802.16m system can use a technique for a femto base station (BS), and researches related to this technique are actively ongoing in recent years. The femto BS represents a very small-sized mobile communication BS used in an indoor environment such as homes, offices, etc. The femto BS has a similar concept with a pico-cell. Yet, the femto BS has a concept of having a more advanced function than the pico-cell. The femto BS generally has lower transmission power, and provides an access to either a subscriber or a subscriber group consisting of access providers. The femto BS is connected to an Internet protocol (IP) network deployed in homes or offices, and provides a mobile communication service by accessing to a core network of a mobile communication system. That is, the femto BS is connected to the core network of the mobile communication system through a broadband connection such as a digital subscriber line (DSL). Further, the femto BS can communicate with a macro BS overlaid with the femto BS by exchanging a control message through an air-interface. A user of the mobile communication system may receive a service via a conventional macro BS in an outdoor environment, and may receive a service via the femto BS in an indoor environment.

The femto BS improves indoor coverage of the mobile communication system by compensating for a problem in that the conventional macro BS provides a service with poor quality inside a building. Since the femto BS can provide a service only to a specific designated user, a voice service and a data service can be provided with high quality. Further, by reducing a cell size, a next generation cellular system using a high frequency band can have an increased efficiency, and since several small-sized cells are used, there is an advantage in that a frequency reuse number can be increased. Furthermore, the femto BS can provide a new service which is not provided by the macro BS. With the deployment of the femto BS, fixed-mobile convergence (FMC) has been sped up, and industry-based costs can be reduced.

The femto BS generally operates within an authorized spectrum. A frequency band used by the femto BS may be the same as or different from that used in the macro BS. The coverage of the femto BS may overlap with the coverage of the macro BS. The femto BS may provide a service to general users located inside a hot spot, or may provide a service to a closed subscriber group (CSG) which is a group of subscribers authorized by the femto BS or a service provider. When the femto BS provides a service to the CSG, a mobile station located close to the femto BS may be interfered by the femto BS in a downlink scenario, or may causes interference to the femto BS in an uplink scenario.

Accordingly, there is a need for a method capable of effectively decreasing interference between a macro BS and a femto BS.

SUMMARY OF THE INVENTION

The present invention provides a method and apparatus for releasing a blank zone of a femto base station (BS) by a macro BS in a wireless communication system.

In an aspect, a method of releasing a blank zone by a macro base station in a wireless communication system is provided. The method include receiving channel information from a macro mobile station receiving a service from the macro base station, determining whether to release a downlink blank zone assigned in a resource region of a femto base station on the basis of the channel information, and transmitting downlink blank-zone release information to the femto base station if it is determined to release the downlink blank zone, wherein a cell coverage of the femto base station is included in a cell coverage of the macro base station, and the downlink blank zone is a resource region in which downlink transmission is restricted among resource regions used by the femto base station. The channel information may be information regarding a distance between the femto base station and the macro mobile station. The channel information may be information regarding strength of a preamble or a midamble transmitted by the femto base station. The receiving of the channel information may be performed after transmission of the channel information is requested to the macro mobile station. The receiving of the channel information may be performed when the channel information reaches a threshold. The threshold may be transmitted from the macro base station. The threshold may be broadcast from the macro base station. The method may further include receiving a response for the downlink blank-zone release information from the femto base station. If an uplink blank zone is released by the downlink blank-zone release information, the response for the downlink blank-zone release information may comprise uplink blank-zone release information.

In another aspect, a method of releasing a blank zone by a macro base station in a wireless communication system is provided. The method include receiving an uplink blank-zone release request message transmitted from a femto base station of which a resource region is assigned with an uplink blank zone, and transmitting uplink blank-zone release information to the femto base station, wherein a cell coverage of the femto base station is included in a cell coverage of the macro base station, and the uplink blank zone is a resource region in which uplink transmission is restricted among resource regions used by the femto base station. The uplink blank-zone release request message may be transmitted when channel information searched for by the femto base reaches a threshold. The method may further include requesting transmission of channel information to a macro mobile station receiving a service from the macro base station, receiving the channel information from the macro mobile station, determining whether to release a downlink blank zone assigned in a resource region of the femto base on the basis of the channel information, and transmitting downlink blank-zone release information to the femto base station if it is determined to release the downlink blank zone.

In another aspect, a base station in a wireless communication system is provided. The base station include a radio frequency (RF) unit, and a processor, coupled to the RF unit, and configure to receive channel information from a macro mobile station receiving a service from the macro base station, determine whether to release a downlink blank zone assigned in a resource region of a femto base station on the basis of the channel information, and transmit downlink blank-zone release information to the femto base station if it is determined to release the downlink blank zone, wherein a cell coverage of the femto base station is included in a cell coverage of the macro base station, and the downlink blank zone is a resource region in which downlink transmission is restricted among resource regions used by the femto base station.

According to the present invention, interference between a macro base station (BS) and a femto BS can be effectively reduced. In addition, since a blank zone of the femto BS can be released by receiving information from the macro BS, a resource of the femto BS can be effectively used.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the IEEE 802.16m. However, technical features of the present invention are not limited thereto.

Figure 1:
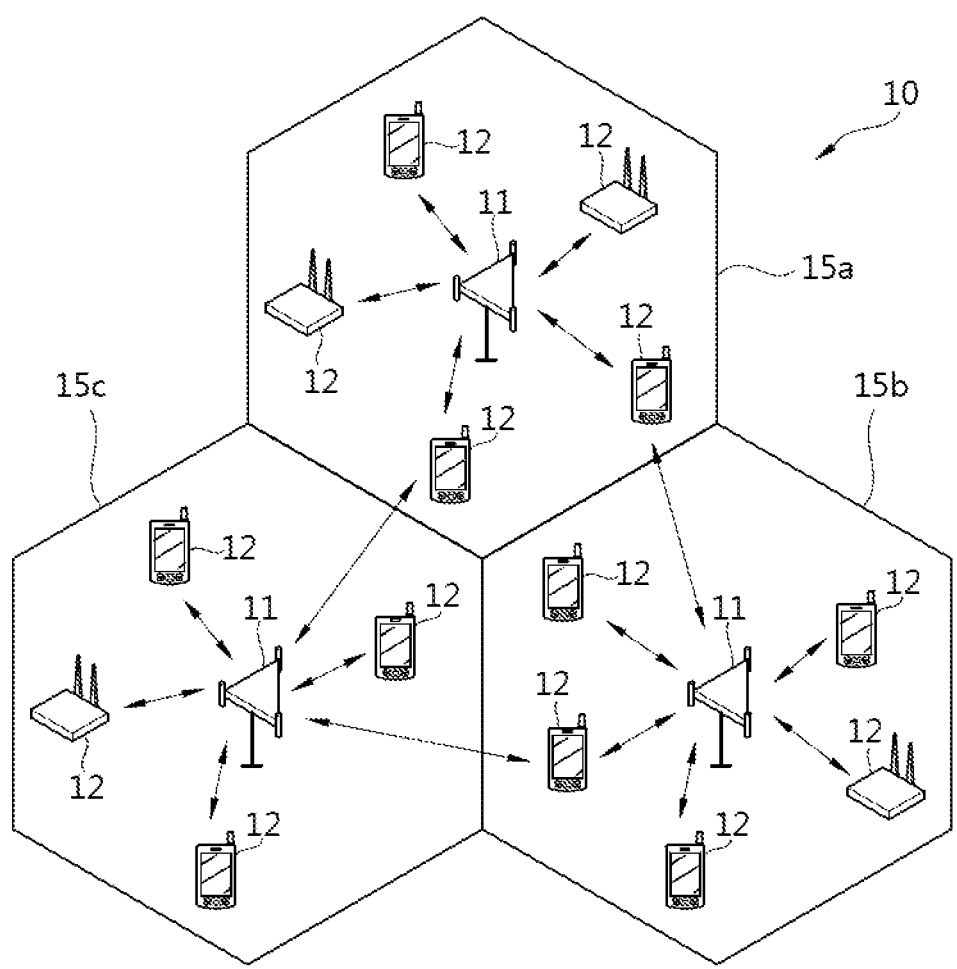
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

A UE belongs to one cell. A cell to which the UE belongs is referred to as a serving cell. A BS providing a communication service to the serving cell is referred to as a serving BS. Since a wireless communication system is a cellular system, there is another cell adjacent to the serving cell. The cell adjacent to the serving cell is referred to as a neighbor cell. A BS providing a communication service to the neighbor cell is referred to as a neighbor BS. The serving cell and the neighbor cell are determined relatively with respect to the UE.

This technique can be used for downlink or uplink. In general, the downlink represents communication from the BS 11 to the UE 12, and the uplink represents communication from the UE 12 to the BS 11. In the downlink, a transmitter is a part of the BS 11, and a receiver is a part of the UE 12. In the uplink, the transmitter is a part of the UE 12, and the receiver is a part of the BS 11.

Figure 2:
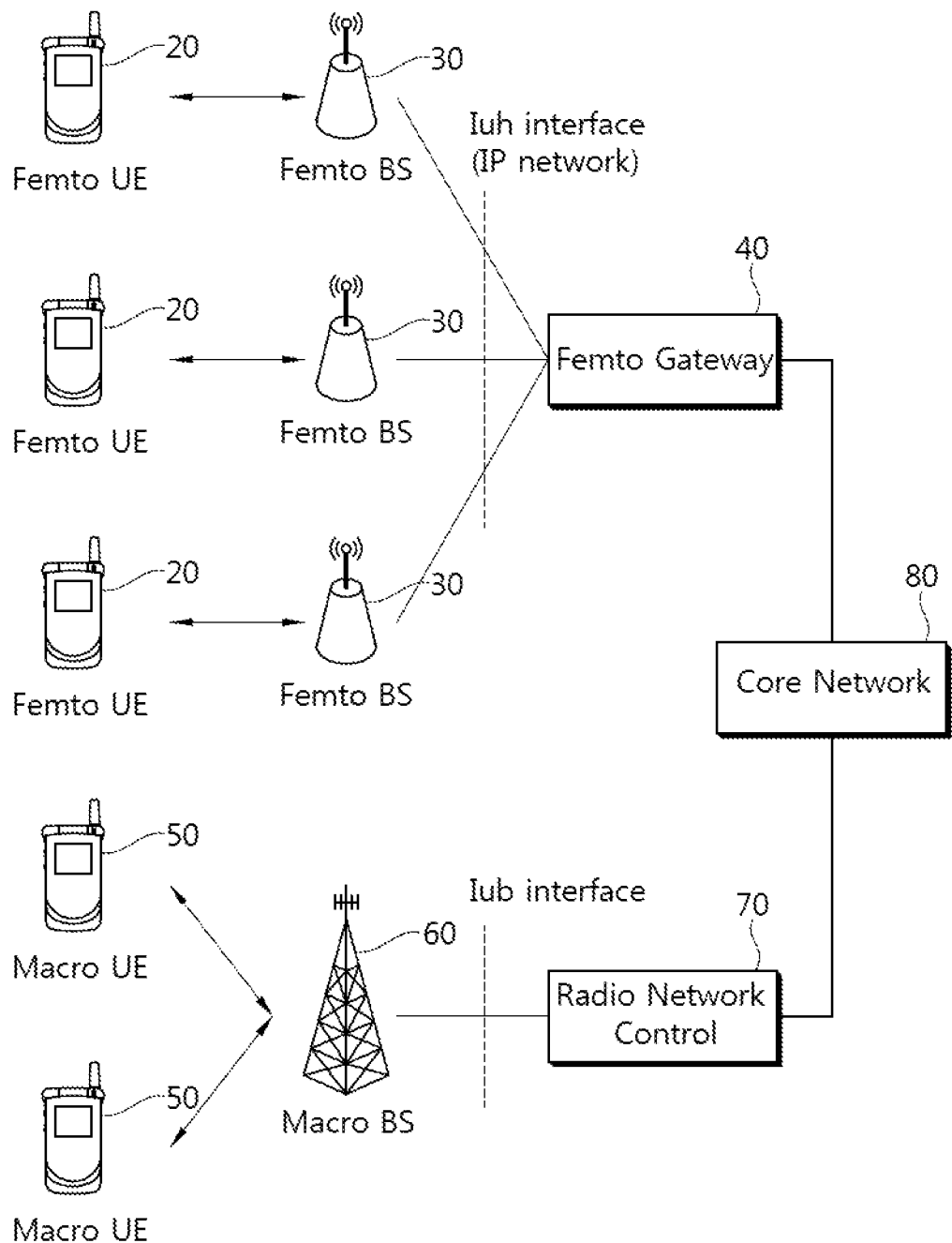
FIG. 2 shows a wireless communication system using a femto base station (BS).

FIG. 2 shows a wireless communication system using a femto BS.

A BS may be classified into a femto BS 30 and a macro BS 60 according to cell coverage or deployment. A cell of the femto BS is smaller in size than a cell of the macro BS. The cell of the femto BS may fully or partially overlap with the cell of the macro BS. The femto BS may also be referred to as other terminologies, such as a femto-cell, a home node-B, a closed subscribed group (CSG), etc. To distinguish from the femto-cell, the macro BS may also be referred to as a macro-cell.

The femto BS connected to a femto gateway 40 through an Iuh interface. The Iuh interface represents an interface between the femto BS and the femto gateway through an Internet protocol (IP) network. The femto gateway is an entity for managing at least one femto BS. The femto gateway may perform registration, authentication, and security processes of the femto BS so that the femto BS can access to a core network 80 of the wireless communication system. The macro BS is connected to a radio network control (RNC) 70 through an Iub interface. The RNC 70 is an entity for managing at least one macro BS, and connects the macro BS to the core network. The macro BS is connected to the core network through a dedicated line, whereas the femto BS is connected to the core network through the IP network.

A UE accessing to the femto BS is referred to as a femto MS 20. A UE accessing to the macro BS is referred to as a macro MS 50. When the femto UE is handed over to the macro BS, the femto UE may become the macro MS. When the macro UE is handed over to the femto BS, the macro UE may become the femto MS.

Figure 3:
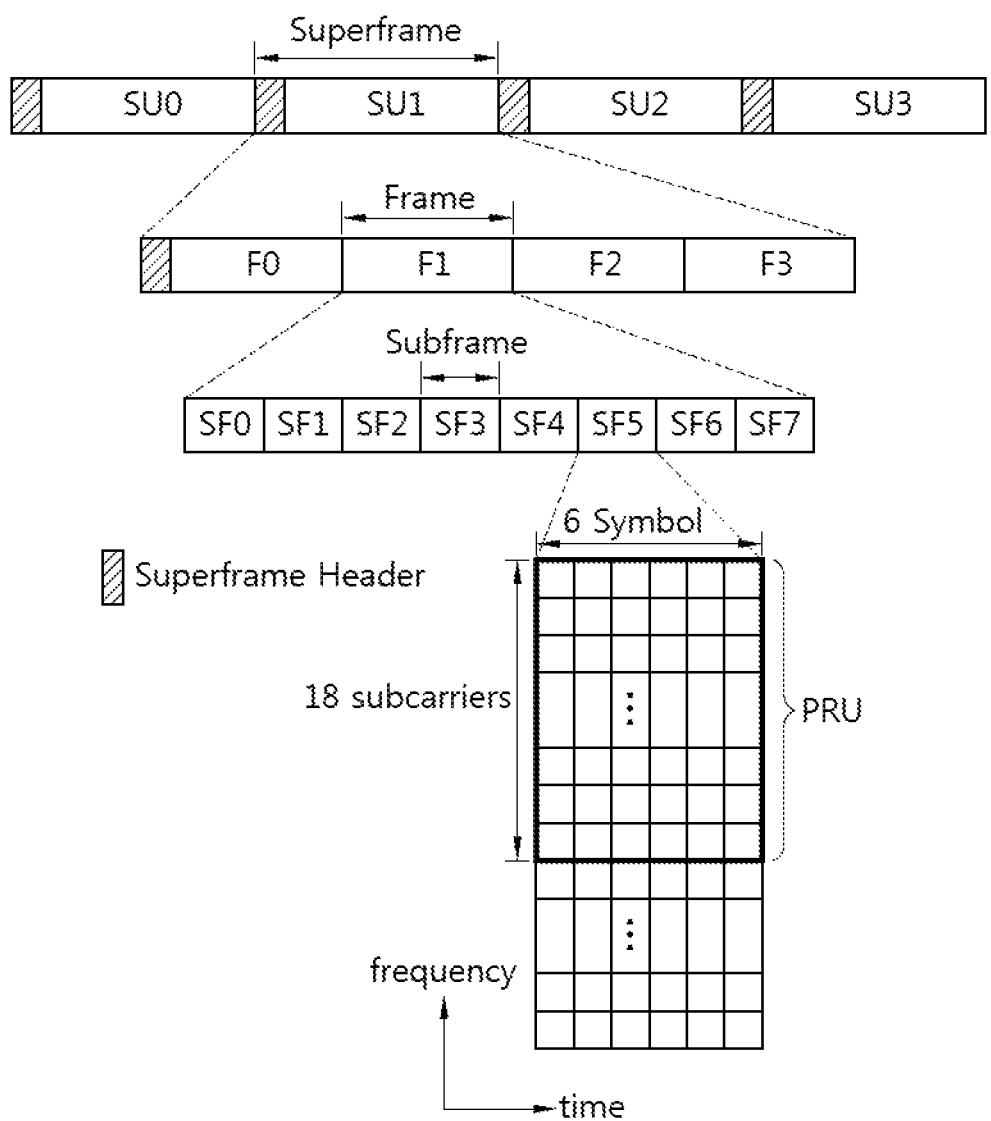
FIG. 3 shows an example of a frame structure.

FIG. 3 shows an example of a frame structure.

Referring to FIG. 3, a superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

The SFH can carry an essential system parameter and system configuration information. The SFH may be located in a first subframe of the SF. The SFH can be classified into a primary-SFH (P-SFH) and a secondary-SFH (S-SFH). The P-SFH and the S-SFH may be transmitted in every superframe.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

The femto BS can be classified as follows according to a subscription mechanism.

1) Closed subscriber group (CSG)—closed femto BS: a femto BS allowing access only for a UE subscribed to the CSG. A UE which is not a subscriber of the CSG cannot access to the femto BS, but can access to only an emergency service.
2) CSG—open femto BS: a femto BS having an access priority for UEs subscribed to the CSG and capable of allowing access of UEs not subscribed to the CSG with a low priority. However, a quality of service (QoS) of the UE subscribed to the CSG must not deteriorate by the access of UEs not subscribed to the CSG.
3) Open subscriber group (OSG): a femto BS allowing access of all UEs irrespective of a subscription status.

The CSG femto BS is either the CSG—femto BS of the clause 1) or the CSG—open femto BS of the clause 2).

If the femto BS is the CSG—closed femto BS, interference may occur between the macro BS and the femto BS. The interference may occur when a macro UE which receives a service from the macro BS is located close to the femto BS.

Figure 4:
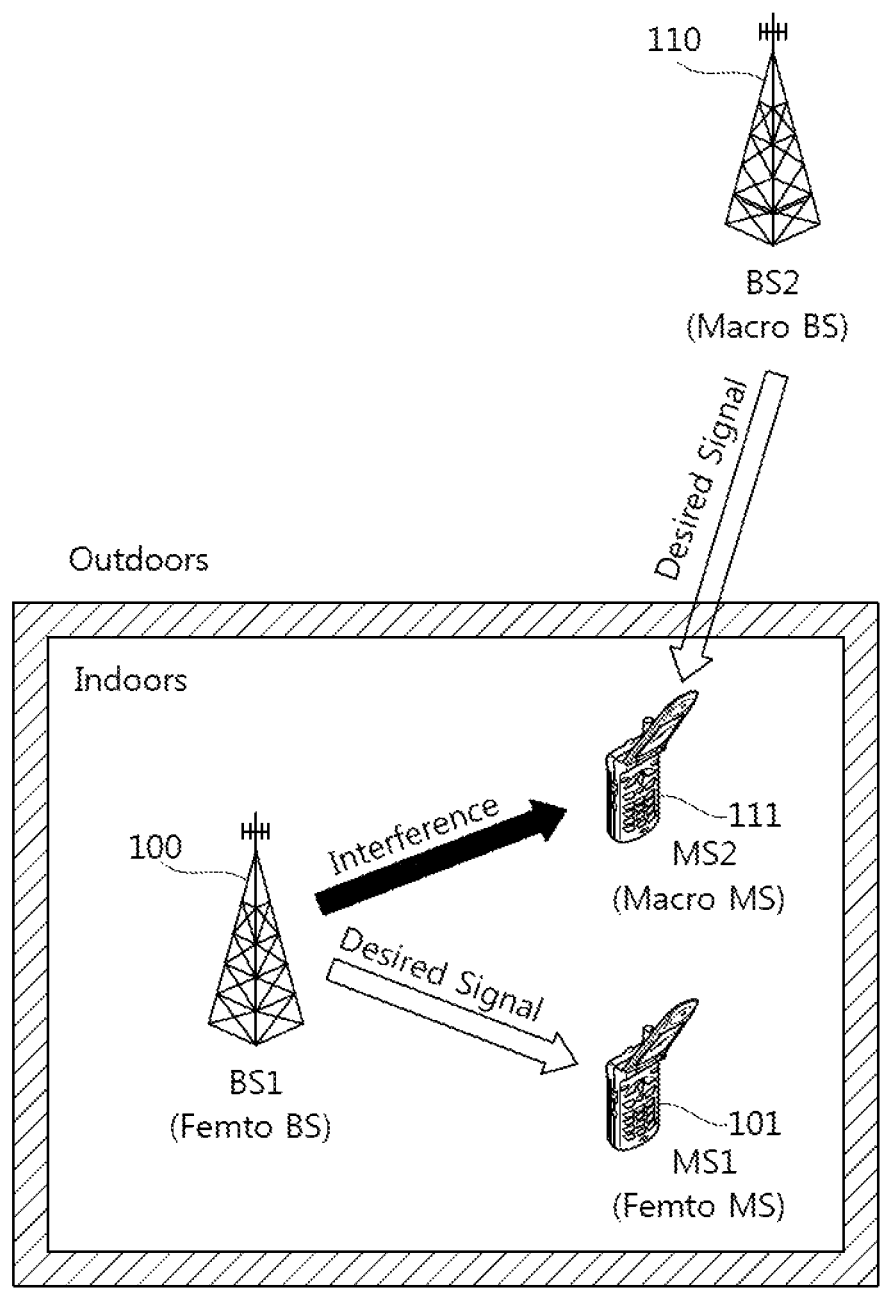
FIG. 4 shows an example of interference occurring between a macro BS and a femto BS in a downlink scenario.

FIG. 4 shows an example of interference occurring between a macro BS and a femto BS in a downlink scenario.

A BS1 100 is a femto BS and provides a service in an indoor environment such as homes or businesses. The BS1 100 transmits data to an MS1 110 which is a femto MS receiving a service from the BS1 100. A BS2 101 is a macro BS and transmits data to an MS2 111 which is a macro MS receiving a service from the BS2 101. Although the MS2 111 is the macro MS, it is located inside the coverage of the BS1 100. Since the BS1 100 is a CSG—closed femto BS, the BS1 100 can provide a service only to the MS1 110 which is a subscriber of the BS1 100 and cannot provide the service to the MS2 111 which is not the subscriber. However, the MS2 111 is affected by data transmitted by the BS1 100, and this causes interference to data transmitted by the BS2 101.

Figure 5:
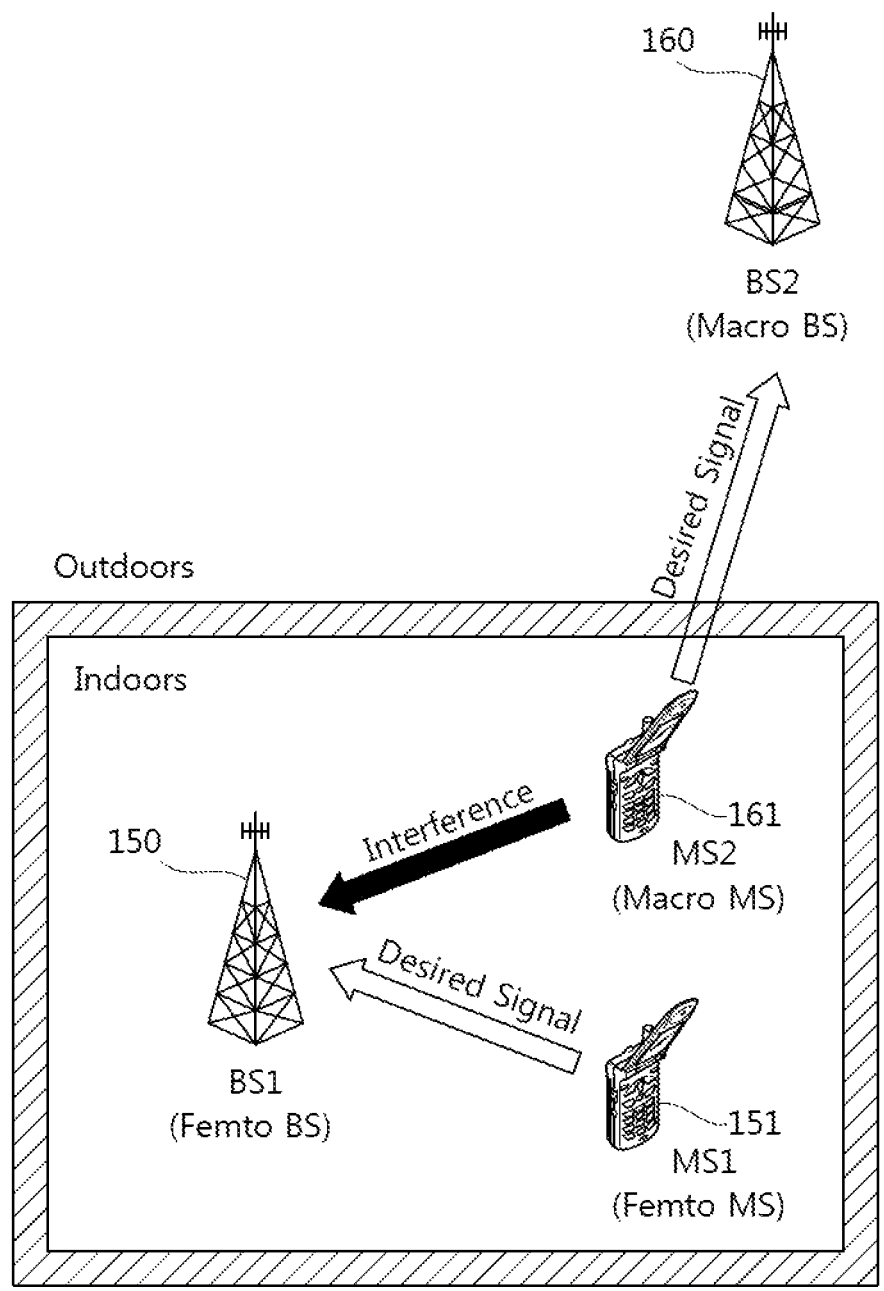
FIG. 5 shows an example of interference occurring between a macro BS and a femto BS in an uplink scenario.

FIG. 5 shows an example of interference occurring between a macro BS and a femto BS in an uplink scenario.

A BS1 150 is a femto BS and provides a service in an indoor environment such as homes or businesses. The BS1 150 receives data from an MS1 160 which is a femto MS receiving a service from the BS1 150. A BS2 151 which is a macro BS receives data from an MS2 161 which is a macro MS receiving a service from the BS2 151. Although the MS2 161 is the macro MS, it is located inside the coverage of the BS1 150. Since the BS1 150 is a CSG—closed femto BS, the BS1 150 can provide a service only to the MS1 160 which is a subscriber of the BS1 150 and cannot provide the service to the MS2 161 which is not the subscriber. However, the BS1 150 may be affected by data transmitted by the MS2 161, and this causes interference to data transmitted by the MS1 160.

There is a need for a method for decreasing interference between the macro BS and the femto BS and for minimizing influence acting on the macro BS as shown in FIG. 4 and FIG. 5. For this, a method of inserting a blank zone or a dead zone to a resource used by the femto BS may be proposed.

Figure 6:
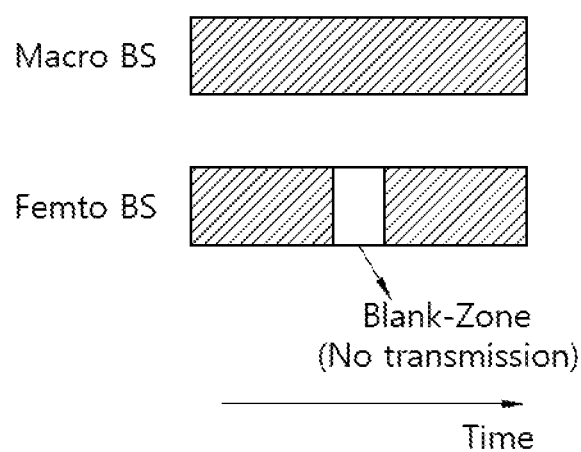
FIG. 6 shows an example of a resource region assigned with a blank zone according to time division multiplexing (TDM).

FIG. 6 shows an example of a resource region assigned with a blank zone according to time division multiplexing (TDM).

A macro BS uses a resource region corresponding to a full time slot. On the other hand, a femto BS may assign a specific time region to a blank zone so that no data is transmitted in the blank zone. Therefore, interference caused by a macro MS may not occur in the blank zone.

Figure 7:
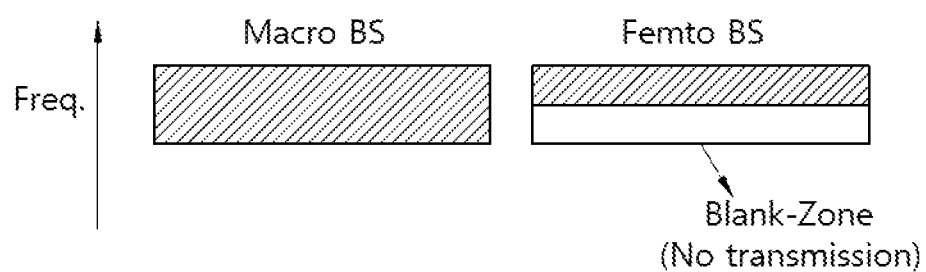
FIG. 7 shows an example of a resource region assigned with a blank zone according to frequency division multiplexing (FDM).

FIG. 7 shows an example of a resource region assigned with a blank zone according to frequency division multiplexing (FDM).

A macro BS uses a resource region corresponding to a full frequency band. On the other hand, a femto BS may assign a specific frequency region to a blank zone so that no data is transmitted in the blank zone. Therefore, interference caused by a macro MS may not occur in the blank zone.

The blank zone based on the TDM and the blank zone based on the FDM may be simultaneously assigned. That is, a specific time may be assigned to a blank zone while assigning a specific frequency also to the blank zone so that no data is transmitted in the blank zone. Optionally, the blank zone may be assigned to the macro BS according to a situation.

Figure 8:
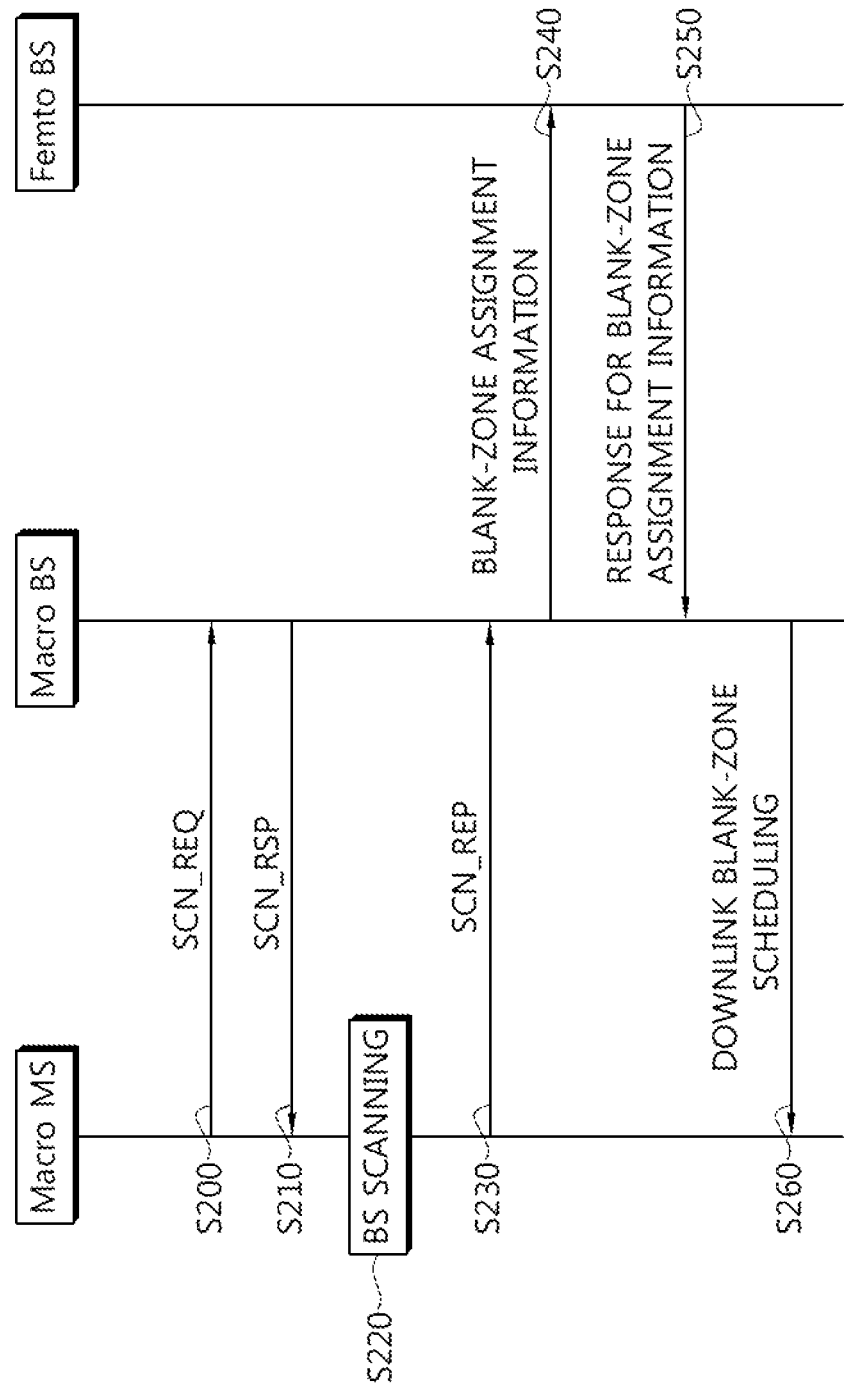
FIG. 8 shows a method of assigning a blank zone in a resource region of a femto BS according to an embodiment of the present invention.

FIG. 8 shows a method of assigning a blank zone in a resource region of a femto BS according to an embodiment of the present invention. This embodiment applies to a downlink scenario.

In step S200, a macro MS transmits a scan request message (i.e., SCN_REQ) to a macro BS. In the downlink scenario, the macro MS may be interfered mainly by downlink transmission of a femto BS. Alternatively, the macro MS may be interfered by the macro BS. Therefore, upon sensing the interference, the macro MS transmits the scan request message to the macro BS to request scanning of BSs existing around the macro MS. The scan request message may have a different format according to a type of BSs to be scanned. In general, the macro MS may have an intrinsic threshold for handover (HO). The threshold may be a received signal strength indicator (RSSI) threshold or a carrier-to-interference-and-noise ratio (CINR) threshold. A system including the femto BS may has a new interference threshold depending on interference caused by the femto BS.

In step S210, the macro BS transmits a scan response message (i.e., SCN_RSP) to the macro MS.

In step S220, the macro MS performs BS scanning.

In step S230, the macro MS transmits a scan report message (i.e., SCN_REP) to the macro BS.

In step S240, if it is determined that the macro MS is interfered by the femto BS, the macro BS transmits blank-zone assignment information to the femto BS. The blank-zone assignment information may be transmitted through a back-bone network or the like.

In step S250, the femto BS transmits a response for the blank-zone assignment information to the macro BS. The response may include information on an uplink interference level. This is for uplink blank-zone assignment which may be performed at a later time.

In step S260, the macro BS schedules a downlink blank zone with respect to the macro BS, and the femto BS nullifies a resource region assigned with the downlink blank zone.

Figure 9:
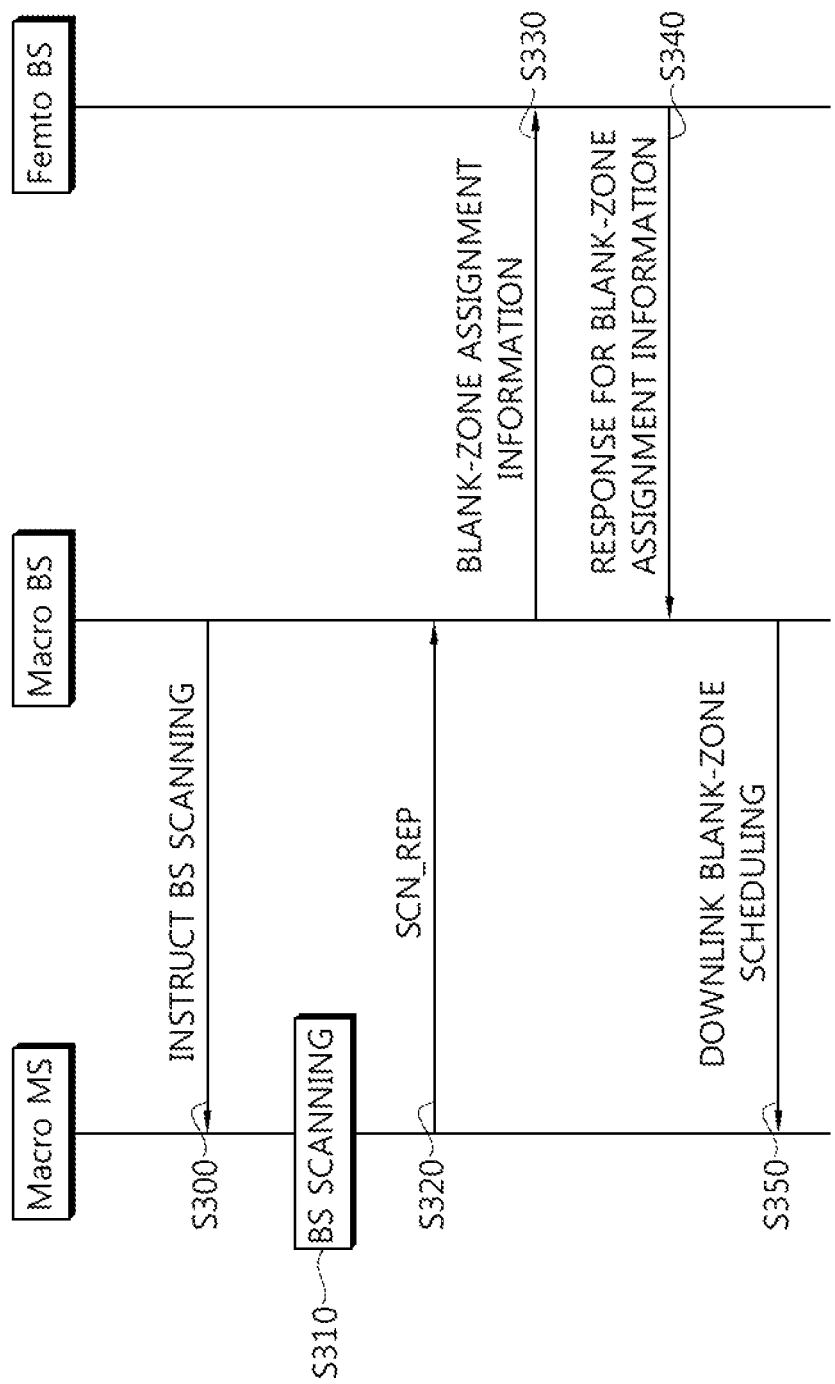
FIG. 9 shows a method of assigning a blank zone in a resource region of a femto BS according to another embodiment of the present invention.

FIG. 9 shows a method of assigning a blank zone in a resource region of a femto BS according to another embodiment of the present invention. This embodiment applies to a downlink scenario.

In step S300, a macro BS instructs a macro MS to perform BS scanning. According to which BS is scanned between the femto BS and the macro BS, various instruction messages may be transmitted to the macro MS.

In step S310, the macro MS performs BS scanning.

In step S320, the macro MS transmits a scan report message (i.e., SCN_REP) to the macro BS.

In step S330, if it is determined that the macro MS is interfered by the femto BS, the macro BS transmits blank-zone assignment information to the femto BS. The blank-zone assignment information may be transmitted through a back-bone network or the like.

In step S340, the femto BS transmits a response for the blank-zone assignment information to the macro BS. The response may include information on an uplink interference level. This is for uplink blank-zone assignment which may be performed at a later time.

In step S350, the macro BS schedules a downlink blank zone with respect to the macro BS, and the femto BS nullifies a resource region assigned with the downlink blank zone.

Figure 10:
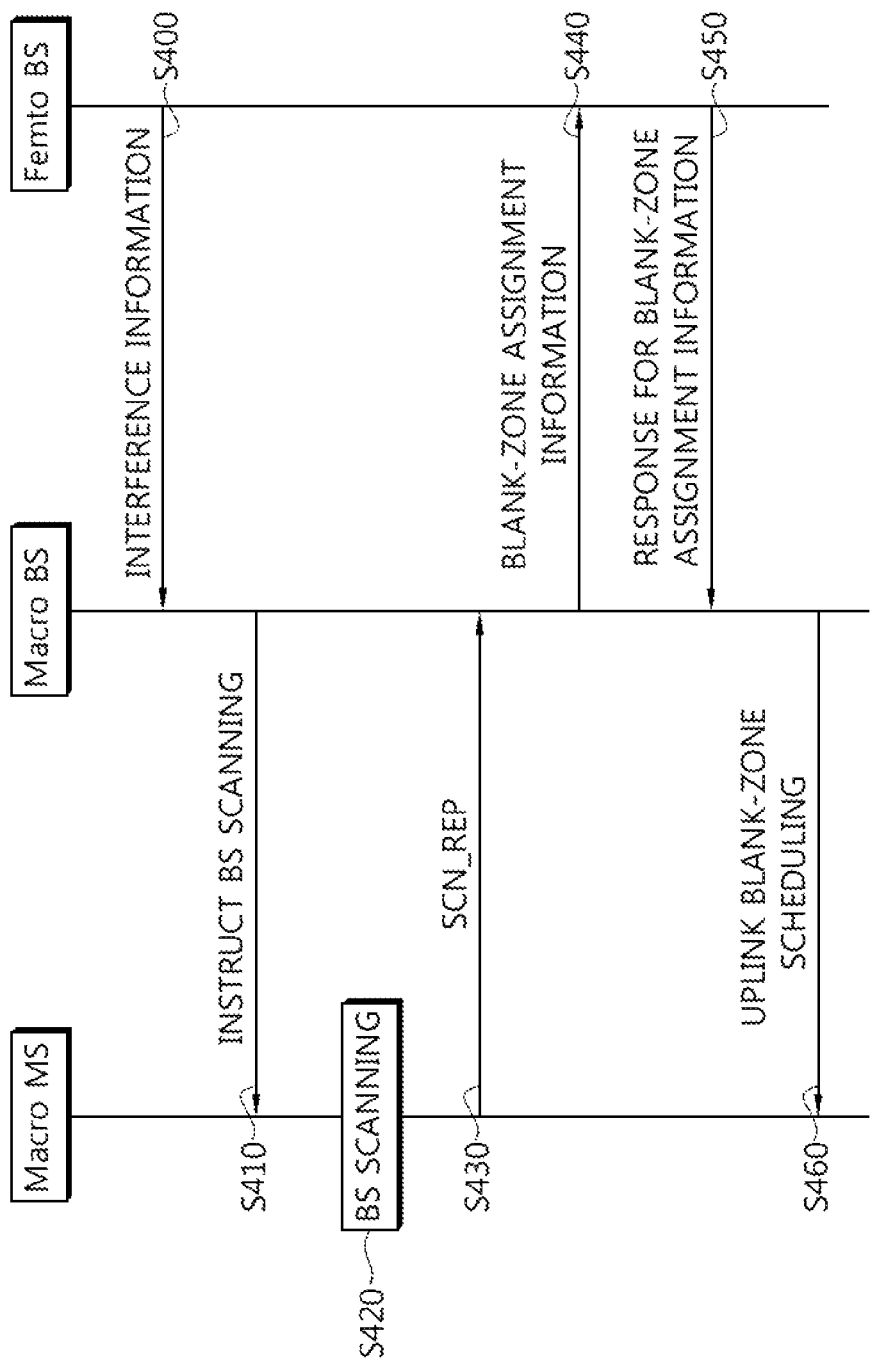
FIG. 10 shows a method of assigning a blank zone in a resource region of a femto BS according to another embodiment of the present invention.

FIG. 10 shows a method of assigning a blank zone in a resource region of a femto BS according to another embodiment of the present invention. This embodiment applies to an uplink scenario.

In step S400, the femto BS experiencing interference transmits information on the interference to a macro BS. The interference may occur by uplink transmission of a macro MS. Whether the interference is caused by the macro MS may be determined by the femto BS. Alternatively, information on time and frequency regions in which the femto BS is interfered may be reported to the macro BS. The information on the interference may be transmitted through a back-bone network or the like.

In step S410, the macro BS instructs the macro MS to perform BS scanning. The BS scanning may be performed limitedly only for the femto BS.

In step S420, the macro MS performs BS scanning.

In step S430, the macro MS transmits a scan report message (i.e., SCN_REP) to the macro BS.

In step S440, if it is determined that the macro MS is interfered by the femto BS, the macro BS transmits blank-zone assignment information to the femto BS. The blank-zone assignment information may be transmitted through a back-bone network or the like.

In step S450, the femto BS transmits a response for the blank-zone assignment information to the macro BS.

In step S460, the macro BS schedules an uplink blank zone with respect to the macro BS, and the femto BS nullifies a resource region assigned with the uplink blank zone.

Hereinafter, the proposed method of releasing a blank zone will be described according to embodiments of the present invention.

Since signal transmission or reception is limited in a blank zone of a femto BS, efficiency of resource usage decreases. Therefore, even if the blank zone is assigned in a resource region of the femto BS, when interference caused by the femto BS in a downlink scenario or interference caused by the macro MS in an uplink scenario is decreased to below a threshold, the assigned blank zone needs to be released as soon as possible. Alternatively, if a femto BS involving interference is separated from the macro MS by a distance greater than or equal to specific distance, an interference level decreases by that extent. Therefore, the assigned blank zone needs to be released also in this case.

Figure 11:
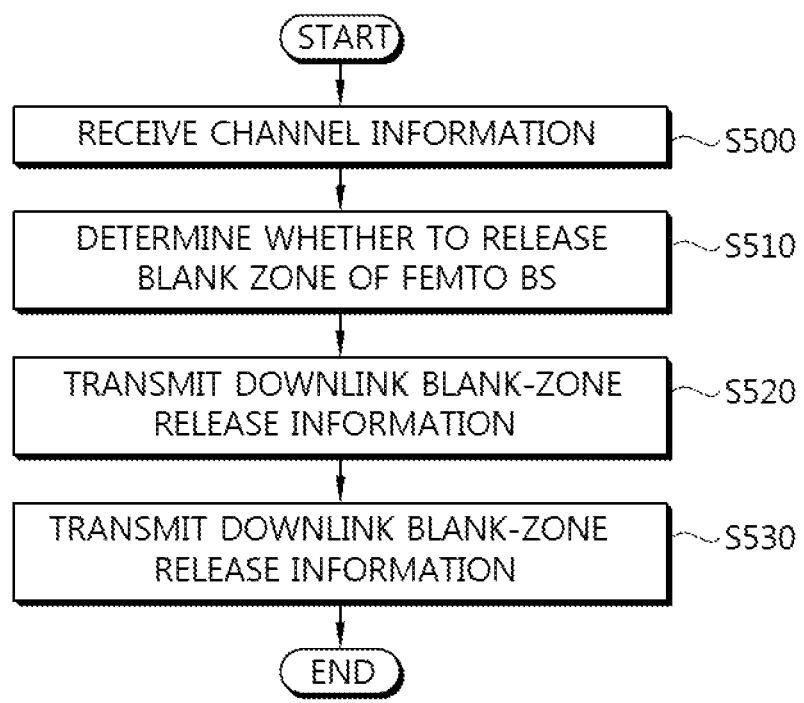
FIG. 11 shows the proposed method of releasing a blank zone according to an embodiment of the present invention.

FIG. 11 shows the proposed method of releasing a blank zone according to an embodiment of the present invention. Herein, a downlink blank zone is released.

In step S500, a macro BS receives channel information from a macro MS.

Since the macro BS needs to release a blank zone assigned in a resource region of the femto BS as soon as possible, the macro BS may persistently request the macro MS to report an interference level. The channel information indicating the interference level may be a distance between the macro MS and the femto BS assigned with the blank zone or channel state information (e.g., CQI, CINR, RSSI, or the like) representing a channel state. The distance or channel state information (e.g., CQI, CINR, RSSI, or the like) used as the channel information may be measured by using a resource region assigned to the macro MS, or may be measured by using a preamble or a midamble of the femto BS. If a blank zone of the femto BS is assigned, the channel state is good in general. Thus, when releasing the assigned blank zone, it may be effective to calculate a physical distance between the femto BS and the macro MS so that the assigned blank zone is released when the distance is greater than or equal to a specific distance. Alternatively, it may be effective to measure strength of the preamble or midamble so that the blank zone is released when the strength is less than or equal to a specific level. Alternatively, the channel information may be transmitted when it is specified by the macro MS instead of using the request of the macro BS. For example, if the distance between the femto BS and the macro MS is greater than or equal to a threshold, the macro MS may transmit the distance information to the macro BS so that the macro BS releases the blank zone of the femto BS. Information on the threshold may be reported by the macro BS to the macro MS according to a channel environment. The information on the threshold may be broadcast by using SFH, ABI, or the like, or may be transmitted to the macro BS by using a message. Alternatively, the threshold may be a second threshold specified to an MS subscribed to a CSG instead of a predetermined value for handover or the like. The second threshold may be used for assignment and release of the blank zone.

In step S510, the macro BS determines whether to release the blank zone assigned in the resource region of the femto BS.

In step S520, the macro BS transmits downlink blank-zone release information to the femto BS, and releases a downlink blank zone assigned in the resource region of the femto BS. If an uplink blank zone is assigned in the resource region of the femto BS in addition to the downlink blank zone, the femto BS may release up to the uplink blank zone in addition to the downlink blank zone by receiving the downlink blank-zone release information.

In step S530, the macro BS receives a response for the downlink blank-zone release information from the femto BS. If the uplink blank zone is released in step S520, the response may include information indicating that the uplink blank zone is released.

Figure 12:
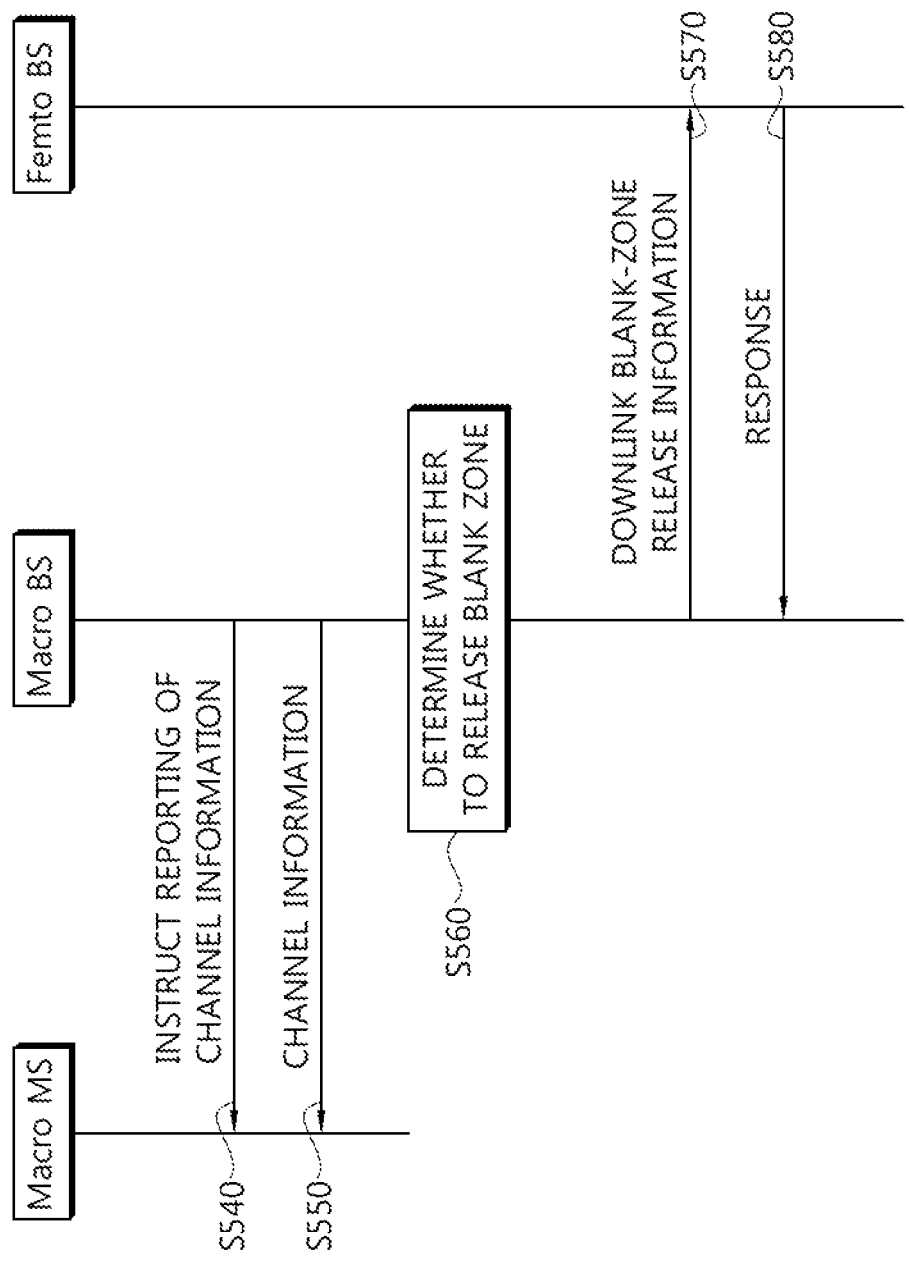
FIG. 12 shows the proposed method of releasing a blank zone according to another embodiment of the present invention.

FIG. 12 shows the proposed method of releasing a blank zone according to another embodiment of the present invention. Herein, a downlink blank zone is released.

In step S540, a macro BS instructs a macro MS to report channel information.

In step S550, the macro BS transmits the channel information to the macro BS.

In step S560, the macro BS determines whether to release a downlink blank zone assigned in a resource region of a femto BS on the basis of the received channel information.

In step S570, if the macro BS determines to release the downlink blank zone, the macro BS transmits downlink blank-zone release information to the femto BS.

In step S580, the femto BS transmits a response for the downlink bank-zone release information to the macro BS.

Figure 13:
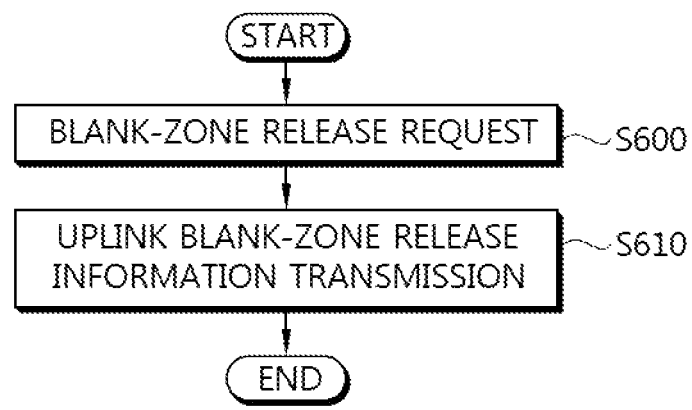
FIG. 13 shows the proposed method of releasing a blank zone according to another embodiment of the present invention.

FIG. 13 shows the proposed method of releasing a blank zone according to another embodiment of the present invention. Herein, an uplink blank zone is released.

In step S600, a macro BS receives an uplink blank-zone release request from a femto BS. If the femto BS experiences interference caused by a macro MS, an uplink blank zone is assigned in a resource region. The femto BS may persistently monitor a level of interference caused by the macro MS or a distance to the macro MS. If the interference level is less than or equal to a threshold or if the distance to the macro MS is greater than or equal to a specific distance, the femto BS may request the macro BS to release an uplink blank zone. Alternatively, since it may not be easy for the femto BS to monitor the distance to the macro MS, if the uplink blank zone is assigned in the resource region of the femto BS, the macro BS may mandatorily instruct the macro MS to monitor and report channel information of the femto BS. The macro BS may instruct the femto BS to release the uplink blank zone on the basis of the channel information reported by the macro MS.

In step S610, the macro BS transmits uplink blank-zone release information to the femto BS, and releases the uplink blank zone assigned in the resource region of the femto BS. If the uplink blank-zone release request is received from the femto BS, there is a high probability that an interference level is decreased in a downlink scenario, and thus the macro MS may be instructed to report a channel state. The macro BS may determine whether to release a downlink blank zone by receiving the report of the channel state.

Figure 14:
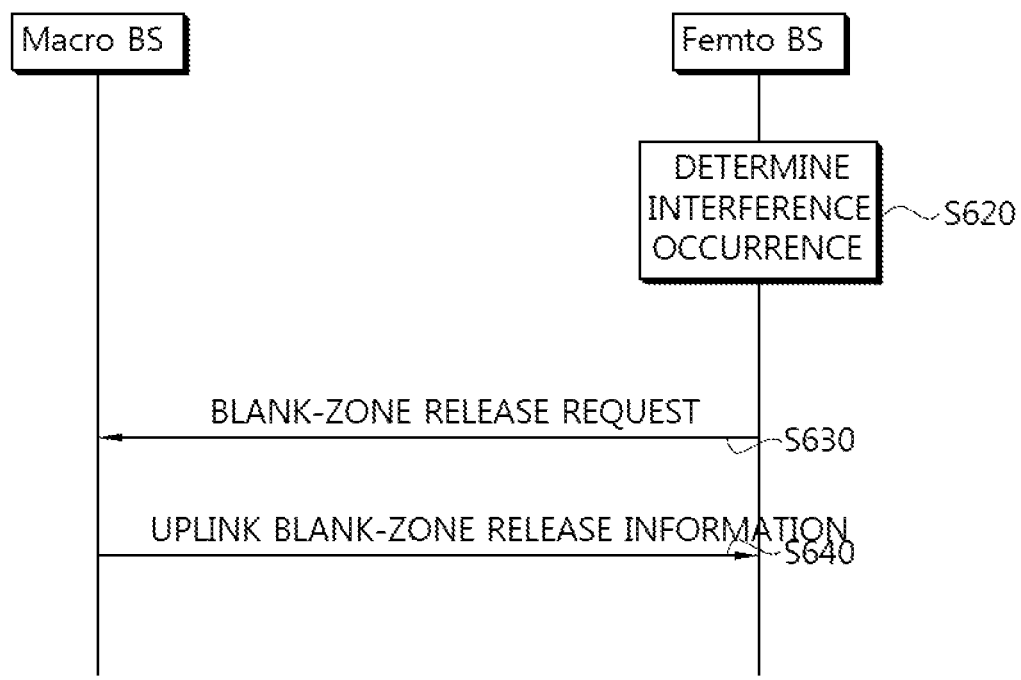
FIG. 14 shows the proposed method of releasing a blank zone according to another embodiment of the present invention.

FIG. 14 shows the proposed method of releasing a blank zone according to another embodiment of the present invention. Herein, an uplink blank zone is released.

In step S620, a femto BS monitors a level of uplink interference cased by a macro MS and determines whether interference exists.

In step S630, the femto BS requests a macro BS to release an uplink blank zone.

In step S640, the macro BS transmits uplink blank-zone release information to the femto BS, and releases an uplink blank zone assigned in a resource region of the femto BS.

Figure 15:
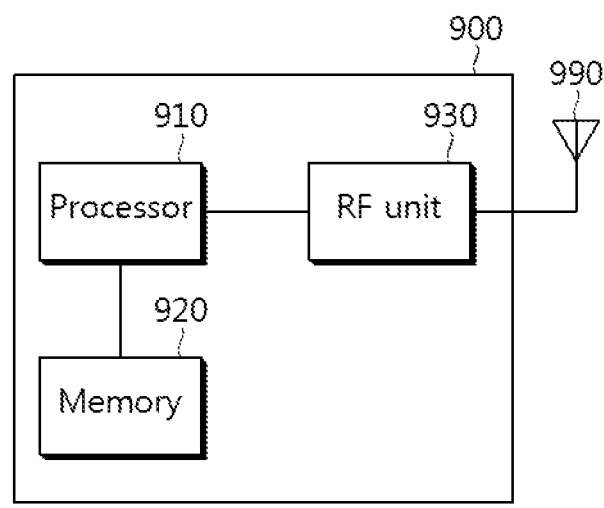
FIG. 15 is a block diagram showing a BS for implementing an embodiment of the present invention.

FIG. 15 is a block diagram showing a BS for implementing an embodiment of the present invention. A receiver 900 includes a processor 910, a memory 920, and a radio frequency (RF) unit 930.

The processor 910 implements proposed functions, processes, and/or method. The processor 910 receives channel information from an MS, determines whether to release a downlink blank zone assigned in a resource region of a femto BS on the basis of the channel information, and if it is determined to release the downlink blank zone, transmits downlink blank-zone release information to the femto BS. The downlink blank zone is a resource region in which downlink transmission is restricted among resource regions used by the femto BS. Layers of a radio interface protocol can be implemented by the processor 910. The memory 920 is coupled to the processor 910 and stores a variety of information for driving the processor 910. The RF unit 930 is coupled to the processor 910, and transmits and/or receives radio signals.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

The aforementioned embodiments include various exemplary aspects. Although all possible combinations for representing the various aspects cannot be described, it will be understood by those skilled in the art that other combinations are also possible. Therefore, all replacements, modifications, and changes should fall within the spirit and scope of the claims of the present invention.

What is claimed is:

1. A method of releasing a blank zone by a macro base station in a wireless communication system, the method comprising:
   receiving channel information from a macro mobile station receiving a service from the macro base station;
   determining whether to release a downlink blank zone assigned in a resource region of a femto base station on the basis of the channel information; and
   transmitting downlink blank-zone release information to the femto base station if it is determined to release the downlink blank zone,
   wherein a cell coverage of the femto base station is included in a cell coverage of the macro base station, and the downlink blank zone is a resource region in which downlink transmission is restricted among resource regions used by the femto base station.

2. The method of claim 1, wherein the channel information is information regarding a distance between the femto base station and the macro mobile station.

3. The method of claim 1, wherein the channel information is information regarding strength of a preamble or a midamble transmitted by the femto base station.

4. The method of claim 1, wherein the receiving of the channel information is performed after transmission of the channel information is requested to the macro mobile station.

5. The method of claim 1, wherein the receiving of the channel information is performed when the channel information reaches a threshold.

6. The method of claim 5, wherein the threshold is transmitted from the macro base station.

7. The method of claim 5, wherein the threshold is broadcast from the macro base station.

8. The method of claim 1, further comprising receiving a response for the downlink blank-zone release information from the femto base station.

9. The method of claim 7, wherein, if an uplink blank zone is released by the downlink blank-zone release information, the response for the downlink blank-zone release information comprises uplink blank-zone release information.

10. A method of releasing a blank zone by a macro base station in a wireless communication system, the method comprising:
    receiving an uplink blank-zone release request message transmitted from a femto base station of which a resource region is assigned with an uplink blank zone; and
    transmitting uplink blank-zone release information to the femto base station,
    wherein a cell coverage of the femto base station is included in a cell coverage of the macro base station, and the uplink blank zone is a resource region in which uplink transmission is restricted among resource regions used by the femto base station.

11. The method of claim 9, wherein the uplink blank-zone release request message is transmitted when channel information searched for by the femto base reaches a threshold.

12. The method of claim 9, further comprising:
    requesting transmission of channel information to a macro mobile station receiving a service from the macro base station;
    receiving the channel information from the macro mobile station;
    determining whether to release a downlink blank zone assigned in a resource region of the femto base on the basis of the channel information; and
    transmitting downlink blank-zone release information to the femto base station if it is determined to release the downlink blank zone.

13. A base station in a wireless communication system, comprising:
    a radio frequency (RF) unit; and
    a processor, coupled to the RF unit, and configure to:
    receive channel information from a macro mobile station receiving a service from the macro base station,
    determine whether to release a downlink blank zone assigned in a resource region of a femto base station on the basis of the channel information, and
    transmit downlink blank-zone release information to the femto base station if it is determined to release the downlink blank zone,
    wherein a cell coverage of the femto base station is included in a cell coverage of the macro base station, and the downlink blank zone is a resource region in which downlink transmission is restricted among resource regions used by the femto base station.

* * * * *